2,998,404
METHOD OF DETERMINING DEGREE OF EXOTHERMIC REACTION AND APPARATUS THEREFOR

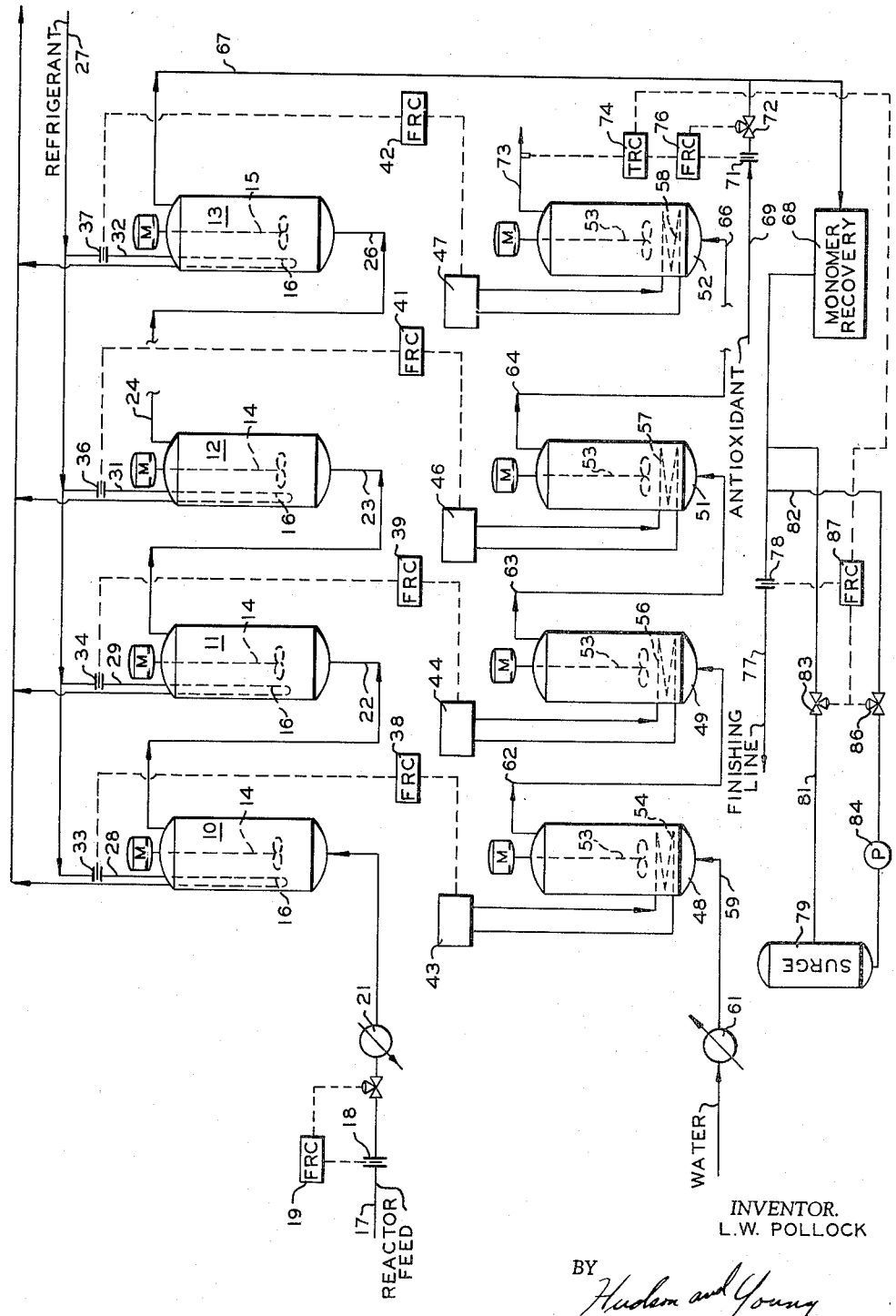

Lyle W. Pollock, Bartlesville, Okla., assignor to Phillips Petroleum Company, a corporation of Delaware
Filed Nov. 12, 1957, Ser. No. 695,701
7 Claims. (Cl. 260—45.7)

This invention relates to a method of determining the degree of an exothermic reaction and apparatus therefor.

Many chemical reactions are exothermic and a measure of the heat generated provides an indication of the degree of reaction. Some exothermic reactions are, however, conducted at a constant temperature, the heat of reaction being removed during the course of the reaction. The present invention is applicable to such reactions and provides a measure of determination of the degree of an exothermic reaction which takes place over a considerable period of time.

One process in which my invention will find particular application is in the continuous polymerization of unsaturated monomers, as exemplified by the low temperature polymerization of butadiene and styrene. Such a low temperature polymerization is described by Larson in Chemical Engineering Progress, vol. 47, No. 5, May 1951 at pages 270–274. The invention is particularly adaptable to this system and provides a method for determining the degree of polymerization of the monomers fed to the system. This knowledge is valuable in that the degree of polymerization determines the amount of additives, such as the antioxidant, supplied to the polymer. Since the reaction takes place over a considerable period of time, a system is required which takes this, as well as mixing and flow characteristics, into account.

The following are objects of my invention.

An object of my invention is to provide a method of determining the degree of an exothermic reaction. A further object of my invention is to provide a method for determining the degree of polymerization in a cold rubber polymerization process. A further object of my invention is to provide an automatic system for supplying antioxidant to the effluent from a continuous polymerization system. A further object of my invention is to provide apparatus for carrying out these methods.

Other objects and advantages of my invention will be apparent to one skilled in the art upon reading this disclosure, accompanying and forming a part of which is a drawing showing, in schematic form, a specific embodiment of my invention.

Broadly, my invention comprises a method of controlling the addition of an additive to the effluent from an exothermic reaction conducted in a series of reaction zones wherein a constant temperature is maintained in each of the reaction zones. This method comprises providing a simulator system having a plurality of portions, each portion corresponding to one of reaction zones. During the reaction, a quantity of matter or energy is added to each portion of the simulator system in an amount corresponding to the refrigerant supplied to each reaction zone to maintain the previously mentioned constant temperature. By summing the amount of energy or matter supplied to these simulator zones over the time of the reaction, an indication is obtained of the degree of reaction and this sum can be used to control the addition of a material to the reactor effluent. More specifically, and as applied to the polymerization system, there are provided a series of simulator vessels corresponding to the series of polymerization zones. In one modification, a liquid passing successively through the simulator vessels is heated incrementally by an electric heater which operates in response to the flow of refrigerant to the corresponding reaction vessel. Since the amount of refrigerant required to maintain the reaction zone at a constant temperature is proportional to the amount of polymerization taking place, the total heating in the simulator vessels is a measure of the total polymerization. The simulator vessels are constructed to provide the same flow characteristics as that in the polymerization vessels. The temperature of the liquid in the final simulator vessel can be determined and this determination used to control antioxidant supplied to the reactor effluent. Instead of adding heat or energy to the liquid, it is possible to add matter thereto and then to measure the total addition. In such operation, a dye, an acid or base, or radioactive material generally from a common source, is added, the rate of addition being controlled in response to flow of refrigerant to the corresponding reaction vessel, and the sum determined, respectively, by a colorimeter, a pH meter, or a radiation detector. I can use inorganic and organic acids and bases such as sulfuric acid, hydrochloric acid, acetic acid, sodium hydroxide, potassium carbonate, etc. Suitable dyes include ultramarine blue, venetian red, cobalt blue and chrome yellow. Preferred radioactive materials are those which emit gamma radiation and which have a relatively long half-life. Examples include sodium 22, silver 110, cesium 134, selenium 75, and iridium 192, all of which are available from Oak Ridge National Laboratory, being listed in their catalog "Isotopes—Radioactive and Stable." Detecting means for use with dyes and radioactive materials is well known, being shown for instance, in Carpenter 2,599,975 (1952).

This process is more fully set forth and will be more fully understood following a description of the drawing which is directed to the modification where energy (heat) is added to the simulator system.

The drawing is a schematic representation of a synthetic rubber polymerization plant. In most of these plants, a series of 12 polymerization vessels are used but, as they are all alike, only 4 are shown in this drawing. Each of these vessels normally has a capacity of 3,000 to 4,000 gallons. In the drawing the reaction vessels are designated 10, 11, 12 and 13, each of these vessels being provided with agitation means 14 and cooling means 16. While not limited thereto, the reaction vessel shown in Hewitt 2,745,823 (1956) is entirely satisfactory. The reactants are fed to vessel 10 by means of conduit 17, this conduit being provided with an orifice 18 and a rate of flow controller 19. The reactants in conduit 17 pass through a precooler 21 adapted to supply the reactants to vessel 10 at the reaction temperature. Extending from the upper portion of each polymerization vessel there is provided a conduit to convey the reactants to the lower portion of the succeeding reactor, conduits 22, 23, 24 and 26 being shown.

To maintain the desired polymerization temperature a refrigerant is supplied by means of conduit 27 to each of the cooling coils. Temperature sensing elements (not shown) are provided in each reaction zone which are in turn connected to temperature recorder-controllers (not shown) adapted to actuate flow control means (not shown) in the refrigerant supply lines 28, 29, 31 and 32 in order that sufficient refrigerant is supplied to maintain the desired temperature. An orifice is provided in each refrigerant supply line, these being indicated as 33, 34, 36 and 37. Flow recorder-controllers 38, 39, 41 and 42 are provided which measure the amount of refrigerant supplied to each reactor and which operate rheostats 43, 44, 46 and 47. A series of simulator zones 48, 49, 51 and 52 are provided, one simulator zone corresponding to each of the polymerization zones. Each simulator zone is provided with an agitator 53 and a heater, these being, respectively, 54, 56, 57 and 58. Each rheostat is connected to the heater in the corresponding simulator vessel. Water, at a constant temperature, is supplied to simulator vessel 48 by means of conduit 59, the constant temperature being obtained by heat exchanger 61. The water flows successively through the simulator vessels by means of conduits 62, 63, 64 and 66. The effluent from polymerization zone 13 is passed by means of conduit 67 to the monomer recovery zone 68. The antioxidant is supplied to the reactor effluent by means of conduit 69, this conduit having therein an orifice 71 and a valve 72. The effluent from the final simulator zone 52 is passed through conduit 73. The temperature of the material in conduit 73 is determined by temperature recorder controller 74 which in turn is connected to rate of flow controller 76. Rate of flow controller 76 is connected to orifice 71 and valve 72 in order to control the rate of antioxidant addition. Following recovery of unpolymerized monomers, the reactor effluent is passed by means of conduit 77 to the finishing line. Since it is desired to have a contant flow of rubber solids to the finishing line, a surge system is provided. This system comprises surge tank 79, the inlet to this surge tank being conduit 81 connected to conduit 77 and the outlet from surge tank 79 being connected to conduit 77 by means of conduit 82, both 81 and 82 being connected to conduit 77 upstream of orifice 78. Valve 83 is provided in conduit 81 and pump 84 and valve 86 are provided in conduit 82. The output signal from temperature recorder controller 74 is also connected to rate of flow controller 87, this rate of flow controller determining flow in conduit 77 and operating valves 83 and 86 in order to provide a constant flow of rubber solids through conduit 77 to the finishing line.

Additional valves, meters, pumps, etc., common to all such systems are not shown in the interests of clarity.

The operation of my invention is believed to be obvious from the above description. Briefly, the flow of refrigerant is proportional to the polymerization in a particular reaction vessel. More specifically, the flow of refrigerant through conduit 28 increases as the amount of polymerization increases. Rate of flow controller 38 measures this increase and, by means of rheostat 43, increases the amount of heat supplied to the water in simulator vessel 48. As the flow of reaction mixture passes from reaction zone 10 to reaction zone 11, the water from simulator zone 48 passes to zone 49 at the same rate. Rate of flow controller 39 measures the amount of required refrigerant and, by means of rheostat 44, adjusts the heat supplied to simulator vessel 49. This continues through the complete series of reaction zones so that the temperature of the water in conduit 73 is directly proportional to the amount of polymerization in the series of polymerization zones. The simulator vessels are scaled down from the reactor vessels to simulate the mixing and flow characteristics in the large reactors. With the flow simulated in this manner, the residence time distribution in the simulator is equal to the time distribution in the corresponding reactor.

The system is to be distinguished from measuring only total flow at a point in time at refrigerant input 27. Such a system would give the rate of polymerization in each of the reactors but not the degree of polymerization of the output from the last reactor.

Since the temperature in conduit 73 is a measure of the polymerization, a recorder controller system comprising controllers 74 and 76 can be used to control antioxidant to the reactor effluent. In the polymerization of butadiene and styrene to produce synthetic rubber, the polymerization is normally taken to about 65 to 75 percent conversion. Monomers are recovered for recirculation by flashing off the butadiene and steam stripping the styrene from the mixture. These operations are well known and are indicated only as "monomer recovery" in the drawing.

Since it is desirable to have a substantially constant flow of rubber solids to the finishing line, I have provided a surge system which accomplishes this desirable situation. This system is automatic and provides substantially constant rubber solids in conduit 77, this conduit having orifice 78 therein. In normal operation, valves 83 and 86 are positioned so that there is a small flow through line 81 to surge tank 79 and an equal flow back through line 82. The output from temperature recorder 74 is connected to flow controller 87, this flow controller determining flow through orifice 78 and regulating valves 83 and 86. When the percent conversion of the monomers increases, thereby tending to increase flow of rubber solids through conduit 77, it will be seen that this flow should be reduced. When this higher conversion is obtained, it will be indicated by temperature recorder controller 74 which will cause flow controller 87 to open valve 83 and close valve 86 sufficiently to restore the desired rate to the finishing line. This will result in a diversion of a greater part of the material from conduit 77 to surge tank 79. If, thereafter, the degree of polymerization decreases the positioning of valves 83 and 86 will be reversed as a result of a lower temperature in conduit 73, this result being supplied by temperature recorder controller 74 to flow controller 87. With valves 83 and 86 so changed, the net flow will be from surge tank 79, through conduit 82, to conduit 77, this returning the rubber solids content to the finishing line to the desired predetermined figure.

This invention provides an improvement over present operation wherein rubber solids content from the final reactor is determined by a separate laboratory test. The time delay in making such a test necessitates holding the reactor effluent in large surge tanks for a considerable period of time. My invention eliminates the need for these tanks while a determination of rubber solids content is made.

The following example further illustrates my invention but the details given therein are not, of course, necessarily limiting.

*Example*

Butadiene and styrene are polymerized in a series of twelve 3,000-gallon reactors with ammonia used as the refrigerant. Each of the simulator vessels has a capacity of approximately one gallon. The reactor charge comprises, per stream day, 123,000 pounds of butadiene, 41,000 pounds of styrene, 328,000 pounds of water, and 8,200 pounds of soap and the necessary activator, oxidant, modifiers, and other rubber chemicals. The feed is precooled to 41° F. in a precooler. Total reactor residence time is about 13.5 hours wherein a conversion of approximately 68 percent is obtained.

In operation, about 2 percent of the butadiene and styrene are polymerized in the first reactor and about 6 percent additional conversion is obtained in each of the following reactors. For the simulator system water is supplied at about 0.9 gallon per hour when using simulator vessels of approximately 1-gallon capacity. This provides a residence time of about 13.5 hours, this corresponding to the residence time in the reactor series. Water is supplied to the first simulator vessel at about 60° F.

For the polymerization recited above, ammonia flow to the first reactor is approximately 140 pounds per hour and about 420 pounds per hour to each of the following vessels. The system is adjusted so that this ammonia flow, when measured, results in adjustment of the rheostats to provide sufficient electrical heating to raise the temperature of the water in the first simulator vessel about 2° and about 6° in each of the following 11 simulator vessels. This provides a final water temperature of about 128° F. The effluent from the last reactor comprises approximately 35,000 pounds of unconverted butadiene, 17,600 pounds of styrene, 111,400 pounds of bound monomers plus the water and other chemicals. A shortstop is added to stop the polymerization reaction. The system is adjusted such that the temperature of the effluent water, about 128° F., is determined by a temperature recorder controller which adjusts the rate of antioxidant addition to that required. When operating the system as set forth above, approximately 1500 pounds of antioxidant are added per stream day. Since the finishing line is set up to handle approximately 111,400 pounds per stream day of bound monomers there is no net build-up in the surge tank in normal operation. This material in the surge tank is in readiness for supply to the finishing line when the output from the polymerization system falls to an amount below that required by the finishing line, it having been supplied by prior polymerization. Normally about 10,000 pounds of bound monomers are in the surge system and flow therethrough runs 10,000 to 25,000 pounds per stream day.

When the degree of polymerization increases in one or more reactors, increased ammonia flow results in more heating in the respective simulator. When the corresponding material reaches conduit 67 there is a resultant increase in temperature in conduit 73. This actuates controllers 74 and 76 to increase flow through conduit 69. Conversely, it will be seen that flow through conduit 69 is reduced to compensate for reduced conversion when it occurs.

As many possible embodiments can be made of this invention without departing from the scope thereof, it is to be understood that all matter herein set forth is to be interpreted as illustrative and not as unduly limiting the invention.

I claim:

1. A method of determining solids content of a latex produced by exothermic emulsion polymerization in a series of polymerization zones, each of said zones being provided with a heat exchange zone, and wherein a constant temperature is maintained in each polymerization zone by the supply of a refrigerant to said heat exchange zones, comprising providing a simulator system having a plurality of portions, each of said portions corresponding to one of the reaction zones, adding energy to each of the portions of the simulator system in an amount corresponding to the amount of refrigerant supplied to each heat exchange zone, summing the energy supplied to said simulator system, the sum being proportional to the solids content of the latex.

2. A method for determining the solids content of a latex produced by the emulsion polymerization of butadiene and styrene wherein a refrigerant is used to maintain a predetermined temperature in a series of polymerization zones comprising providing a simulator zone corresponding to each polymerization zone, passing a liquid consecutively through the series of simulator zones, adding heat to said simulator zones, the amount of said added heat being proportional to the amount of polymerization in the corresponding polymerization zone, and determining the total heat added to said simulator zones, the amount of said added heat being directly proportional to solids content of the latex.

3. In an emulsion polymerization system wherein butadiene and styrene are polymerized at a predetermined temperature in a series of polymerization zones, each zone being provided with a heat exchange zone, said predetermined temperature being maintained by means of ammonia supplied to each heat exchange zone and wherein an antioxidant is added to the product, the amount of said antioxidant being directly proportional to the solids content of the latex produced, the method comprising providing a simulator zone corresponding to each polymerization zone, passing a stream of water consecutively through said simulator zones, said water being supplied to the first zone at a constant temperature, measuring the flow of ammonia to each heat exchange zone, heating the water in each simulator zone in an amount proportional to the flow of ammonia supplied to the heat exchange zone of the corresponding polymerization zone, measuring the temperature of effluent water from the series of simulator zones, and varying the addition of antioxidant to the product in response to variations in temperature of the effluent water.

4. A polymerization system comprising a plurality of reaction vessels connected in series, heat exchange means in each reaction vessel, a feed conduit connected to the first of said series of reaction vessels and an effluent conduit extending from the last of said series of reaction vessels, a refrigerant supply conduit adapted to supply refrigerant to each of said heat exchange means in order to maintain a constant temperature in each of said reaction vessels, a simulator system, means to add a quantity to said simulator system proportional to the amount of refrigerant supplied to each of the heat exchange means in said reaction vessels, means to sum the quantities supplied to said simulator sytem, an additive supply conduit communicating with said effluent conduit, and means to vary flow through said additive supply conduit in response to variations in the sum of quantities supplied to said simulator system.

5. A polymerization system comprising a plurality of reaction vessels connected in series, heat exchange means in each reaction vessel, a feed conduit connected to the first of said series of reaction vessels and an effluent conduit extending from the last of said series of reaction vessels, a refrigerant supply conduit adapted to supply refrigerant to each of said heat exchange means in order to maintain a constant temperature in each of said reaction vessels, a simulator system, means to add a quantity of energy to said simulator system proportional to the amount of refrigerant supplied to each of the heat exchange means in said reaction vessels, means to sum the quantities supplied to said simulator system, an additive supply conduit communicating with said effluent conduit, and means to vary flow through said additive supply conduit in response to variations in the sum of quantities supplied to said simulator system.

6. A polymerization system comprising a plurality of reaction vessels connected in series, heat exchange means in each reaction vessel, a feed conduit connected to the first of said series of reaction vessels and an effluent conduit extending from the last of said series of reaction vessels, a refrigerant supply conduit adapted to supply refrigerant to each of said heat exchange means in order to maintain a constant temperature in each of said reaction vessels, simulator system, means to add a quantity of matter to said simulator system proportional to the amount of refrigerant supplied to each of the heat exchange means in said reaction vessels, means to sum the quantities supplied to said simulator system, an additive supply conduit communicating with said effluent conduit, and means to vary flow through said additive supply conduit in response to variations in the sum of quantities supplied to said simulator system.

7. A polymerization system comprising a plurality of reaction vessels connected in series, heat exchange means in each reaction vessel, a plurality of simulator vessels connected in series, each simulator vessel corresponding to a reaction vessel, a refrigerant supply conduit to supply refrigerant to each of said heat exchange means, an electrical heater in each of said simulator vessels, each of said heaters being controlled by a rheostat, a flow controller for each rheostat, each said flow controller adjusting the rheostat in response to changes in flow of refrigerant to the heat exchange means of each said reaction vessel, a reactor effluent conduit extending from the downstream end of said plurality of reaction vessels, an antioxidant supply conduit communicating with said reactor effluent conduit, a valve in said antioxidant conduit, a flow controller operatively connected to said valve, a temperature recorder controller connected to mesasure the temperature of the effluent leaving said plurality of simulator vessels and adjust said flow controller in response to changes in temperature of said effluent, leaving said plurality of simulator vessels.

References Cited in the file of this patent

UNITED STATES PATENTS

| | | |
|---|---|---|
| 2,556,851 | Ohsol et al. | June 12, 1951 |
| 2,583,420 | Garber et al. | Jan. 22, 1952 |
| 2,758,475 | Cotton | Aug. 14, 1956 |
| 2,846,422 | Green | Aug. 5, 1958 |

FOREIGN PATENTS

| | | |
|---|---|---|
| 697,991 | Great Britain | Oct. 7, 1953 |

OTHER REFERENCES

Daniels et al.: Experimental Physical Chemistry, 4th ed., pub. by McGraw-Hill, New York, pp. 38–44, copyright 1949.